Patented Aug. 1, 1939

2,168,246

UNITED STATES PATENT OFFICE 2,168,246

PROCESS OF MAKING FROTHED, CELLULAR, OR SPONGELIKE PRODUCT OF COLLOIDAL ORIGIN

Thomas Lewis Shepherd, London, England

No Drawing. Application July 30, 1937, Serial No. 156,606. In Great Britain July 30, 1936

4 Claims. (Cl. 99—81)

This invention relates to frothed, cellular or sponge-like products of colloidal origin, and processes for making the same.

It is known that a frothing or puffing of colloidal substances of animal or vegetable origin which form a gel in contact with a liquid such as water, may be obtained by so treating them, e. g. by heat, that there is a sudden volatilization of a contained liquid, e. g., water. This phenomenon is applicable to foodstuffs; thus, in the complete specification of Letters Patent No. 18,946 of 1912 there is described a method of making (inter alia) a food product in a globular or pellet-like form by taking a starch containing substance in the form of flour, adding water to form a dough therefrom, tumbling the said dough in a rotating drum to cause the formation of globular masses, gelatinizing the said masses under the action of steam, drying the same to about atmospheric dryness and finally frothing or puffing the globular masses by subjecting the same to the action of superheated steam and then suddenly releasing the pressure. A large number of starch containing substances are mentioned as suitable for use in the said process including cassava. However, by the aforesaid process a product is not obtained having the characteristics of the product of the present invention.

A process of making a confection has also been proposed in U. S. specification No. 1,926,347 which comprises making a mixture of tapioca flour, water and flavoring, making a mixture of corn starch, water and flavoring separate from said first mixture, cooking the corn starch mixture first, then combining the mixtures and cooking the combined mixtures at a temperature lower than the temperature at which the corn starch was cooked and converting the same into a generally translucent mass, forming the mass into relatively thin confections, removing substantially all the moisture by drying and then immersing in hot grease so as to pop or swell the same. By this last mentioned process also it is not possible to obtain a product having the characteristics hereinafter mentioned, one cause of which is that completely dry gel, when subjected to the action of a heating medium, such as boiling oil, does not produce this phenomenon.

The process of making a food product according to the invention consists in intimately mixing starchy material consisting of or containing cassava or sago flour with water and additional protein material to form a dough, treating the dough by steam or otherwise so that the starch is partially or wholly gelatinized, drying the gelatinized dough so that a proportion of the water remains therein, cooling the dough and dividing the same into pieces of the desired size, the said pieces being adapted to be immersed in hot oil whereby a frothed cellular or sponge-like product is obtained.

Other features of the invention are hereinafter fully described and claimed in the appended claims.

In one way of carrying the invention into effect, a dough consisting of tapioca (cassava) and water is prepared, the dough being of a consistency comparable with that given to an ordinary flour dough as utilized in bread making. This dough is then steam treated so as to gelatinize and cook the dough. A proportion of the moisture content is removed by drying the dough which is then allowed to cool thoroughly. A product is thus obtained which, when cooked for example in oil, will swell to many times its original size (four to ten times), the resultant boiled or fried product having the following characteristics, namely:

(1) It has a flake-like form, though frothing causes the pieces to swell considerably and to assume an irregularly curved shape.

(2) It is light and tasty.

(3) It is crisp and at the same time has such a degree of shortness that it will "melt in the mouth" when eaten.

(4) Frothing results in a volume increase of about eight times.

(5) The texture is uniform and spongy in appearance.

(6) It is capable of retaining its above qualities for an appreciable period of time.

The flakes or pieces of the gelatinized material may be of any desired size, which on being subjected to frothing will produce articles of food having the above characteristics. Such flakes or pieces can be kept for considerable periods of time, e. g. for several years under suitable conditions, and may be sold as such prior to frothing. The product has been found to be very appetizing.

The following are examples of mixtures which may be employed in the preparation of foodstuffs according to the invention which may be made of various flavors, tastes and shapes as desired.

9 parts by weight of cassava (tapioca) flour.
1 part by weight of ordinary wheat flour.
Salt, according to taste.
Warm water, in sufficient quantity to make the dough kneadable.

9 parts by weight of cassava (tapioca) flour.
1 part by weight of wheat flour.

White of egg and yolk of egg, according to taste.
Warm or cold water in sufficient quantity to make the dough kneadable.

1 lb. of fresh raw shrimps (then peel and grind finely).
1 lb. of cassava (tapioca) flour.
3 teaspoonsful of salt.
2 teaspoonsful of sugar.
Cold water in sufficient quantity to make the dough kneadable.

9 parts by weight of cassava (tapioca) flour.
1 part by weight of wheat flour.
5 parts by weight of fresh raw shrimps (then peel and grind and mix them).
Salt according to taste.
A little sugar (according to taste).
Raw white of egg and yolk of egg, according to wish.
Cold water, sufficient to make the dough kneadable.

|  | Parts by weight |
| --- | --- |
| Cassava flour | 66.1 |
| Self-raising flour | 6.6 |
| Bacraft cheese | 17.6 |
| Cheddar cheese | 8.8 |
| Salt | 0.83 |
| Mustard | 0.07 |
| Cold water | 62.0 |
|  | 162.0 |

I have found that the addition of protein material (egg, cheese, etc.) to the mix has an influence on gelatinization and it renders the structure of the gelatinized mass uniform and complete and comparative samples have shown that where protein is added gelatinization is uniform whereas when protein is not used there is a tendency for a hard central core to be left in the mass. This would seem to indicate that the gelatinization has not been complete because the hard core might represent a non-gelatinized zone of the section. Cheese is a convenient form of adding protein because it provides a flavoring as well as imparting color to the mass.

The above mentioned mixtures are thoroughly kneaded into a uniform dough, which takes about 25 minutes, and shaped as desired according to the shape of the ultimate food product. The shaped dough is then treated in steam ovens such as by the process commonly known as "au bain Marie", the steaming time being dependent upon the bulk of the shaped dough. A "loaf of dough", weighing for example 5 lbs., should be steamed for two or three hours; smaller or larger loaves in proportion.

When the steaming is finished, that is to say, gelatinization is effected, the trays are withdrawn and allowed to cool, this taking between 2 and 6 hours according to the temperature of the room. The trays are then turned out and placed on perforated shelves and allowed to stand for 24 hours.

After this the gelatinized slabs are removed to the setting room and this is maintained at a low temperature of about 16-20° C. There is then a subsequent period in which the slabs are put into a refrigerator at a still lower refrigerating temperature.

The slabs are then removed from the refrigerator and trimmed on the edges, and after being sliced in one way into strips of about 1" broad the series of strips of this width are then sliced at a right-angle into shavings of about $\frac{1}{16}$" so that a number of squares are produced and these are then placed on trays. The trays are accumulated on a large carrier, say up to about 78, and the whole stand is run into a drying chamber and remains there for some 2 hours at a temperature of 54-56° C. By this drying stage a specified water content of 8-12% for each square is obtained.

A very good product is obtained when the dough contains about 26% of cheese (calculated on the dry materials). Cheese is composed substantially of proteins and fats. Proteins are nitrogenous substances and are quite characteristic in their properties, one of which is a considerable (colloidal) affinity for water. Thus proteins or hydrophilic colloids in general help the gelatinization of the tapioca starch content of the dough by holding the moisture in uniform and intimate dispersion therewith. In this connection their presence is particularly useful when operating the process above described but the protein content is also advantageous when operating with a film of the dough as hereinafter explained, which naturally will gelatinize more easily owing to readier contact with steam and heat.

It is obvious that for cheese proteins there can be substituted other proteins which, as already explained, will behave similarly. Actually, in commerce the cheese proteins are separated and sold as casein, therefore it is possible to employ casein and this, together with a quantity of fats, forms a "reconstituted cheese" with which the product can be made.

If desired, gelatine may be employed as the protein material, for example a mixture of gelatine and fats may be used in place of cheese.

Other proteins such as gluten, which is a vegetable protein prepared from wheat, or protein extracts from meat, or even finely powdered dried meat, blood etc., may be employed as the protein material.

In place of protein material pectinous plant food products such as tomato and other fruit or vegetable preparations may be used, or in addition to the protein.

An example of this would be:

|  | Parts by weight |
| --- | --- |
| Cassava flour | 66 |
| Self-raising flour | 6 |
| Tomator chutney | 28 |
| Water | 50 |

Finally, there is the class of substances known as phosphatides which combine the properties of proteins and fats which may be employed, such as egg lecithin and soya bean lecithin. Thus cheese (fats and protein) may be substituted by soya lecithin (fats and proteins).

The addition to the tapioca flour of shrimps, eggs, salt and sugar and the like serves to give the final product a definite predetermined taste and any ingredients imparting a suitable taste to the product may be incorporated in the dough, such as fish paste, lobster or crab, fish, ginger, onions, garlic, chocolate, vanilla, meat extract, meat, cheese, raisins, all kinds of fruit or vegetables such as tomatoes, and we do not wish to confine this invention to products having any particular taste.

The squares may be immersed in any hot oil, such as are known as edible frying oils, viz. ground nut oil, fish oil, olive oil, fat, lard or the like, the temperature of the oil preferably being just one or two degrees below actual boiling point but, if desired, at boiling point. A temperature of 210° C. to 220° C. is suitable. The period of immersion is about 4–5 seconds when the phenomenon already mentioned, namely that of the excessive swelling or expansion, takes place in this process and the slices or cubes, after first having sunk to the bottom of the oil vessel, will rapidly rise and float to the surface.

When the swelling process is completed and the slices or cubes have become slightly brownish or yellowish, they can be lifted out of the oil pan and allowed to drip or they may be put into a centrifuge so that any excess of oil may be eliminated. The final product is then ready for consumption or for dispatch and can be packed in cartons, sealed moistureproof paper bags, tins, vacuum tins or the like, or tinned in the presence of carbon dioxide, nitrogen or other inert gas.

The time required for the oil treatment varies according to the variety of oil used and also depends upon the size and thickness of the slices or cubes or the like, but it generally takes at least three seconds and a maximum of thirty seconds.

Instead of slicing the loaves of dough before the oil treatment above mentioned, the steam dried substance may be extruded through a "vermicelli" machine or the like and the resultant vermicelli-like substance may be pressed by forms or moulds into little cakes, ready to be subjected to the oil treatment to effect swelling. Similarly the dough may be shaped into any other suitable form, such as is used under the name "macaroni", noodles or any other shape.

Prior to the oil treatment the dough may also be mixed with quantities of suitable food dyestuffs so as to impart to the final product the desired color.

The addition of wheat flour in the above examples serves the purpose of binding the dough and to obtain an even distribution of the cassava flour throughout the dough, also to give the final product a more pronounced crispness and to prevent the final product on contact with the air from becoming limp and leathery.

For attaining the objects of this invention my experiments have led me to believe that the use of cassava flour is necessary since in the resulting foodstuff the above characteristics are produced in a higher degree than by the use of any other flour hitherto suggested for the production of puffed or frothed foodstuffs. To the cassava flour there may be added a small percentage (e. g. 10%) by weight of wheat flour (e. g. self-raising flour). However, the best results are obtained with 100% of cassava flour and the properties above mentioned are reduced as the proportion of other flour present increases.

If desired the cassava flour or mixture containing it may be partly or wholly gelatinized prior to use.

The cassava flour may be of any desired fineness. If desired "pearl tapioca" may be utilized and the wheat flour may be substituted by any other suitable edible flour, such as potato flour, corn flour, rye flour, sago flour or the like.

The products prepared as above described have a pleasing taste and appearance. It will be understood that ingredients may be added to obtain any desired appearance, shape, flavor, or taste, without departing from the spirit of the invention.

For example, the final product may, if desired, be covered with fine dry salt, sprinkled with meat extract, cheese powder and other flavorous substances.

It will be understood also that the dried gelatinous product made as above described to the desired shape and size may be marketed in sealed containers and may be subjected to the heat treatment in oil for example, just prior to consumption.

If desired the process may be carried out more or less continuously by feeding the dough as a film on a travelling support such as a metal band, through a steam chamber to effect gelatinization and from thence through a drying chamber, the partially dried material being then cooled and divided into pieces, and finally dried to the desired water content and immersion in heated oil, the last two steps being either continuous or discontinuous, as desired.

I claim:

1. The process of making a food product which consists in intimately mixing with water cassava flour to form a dough, gelatinizing, cooling, dividing into flakes or pieces and drying them to the extent that the moisture content remaining therein is from 8 to 12% and immersing them in a hot edible oil at a temperature from 210 to 220° C., and thereby exploding and expanding them.

2. The process of making a food product which consists in intimately mixing with water a starchy material comprising cassava flour and an edible non-starchy vegetal material which contains a hydrophilic colloid, to form a dough, gelatinizing, cooling, dividing into flakes or pieces and drying them to the extent that the moisture content remaining therein is from 8 to 12%, exploding and expanding them by subjecting them to a frothing process by immersion in an edible oil at a temperature of from 210 to 220° C.

3. The process of making a food product which consists in intimately mixing with water a starchy material comprising cassava flour with an edible non-starchy vegetal material which contains a hydrophilic colloid to form a dough, gelatinizing, cooling, dividing into flakes or pieces, drying them to the extent that the moisture content remaining therein is from 8 to 12% immersing the dried flakes or pieces in a hot edible oil to explode and expand them, whereby a froth cellular or sponge-like product is obtained.

4. The process of making a food product which consists in intimately mixing with water a starchy material comprising cassava flour, with an edible, non-starchy vegetal material which contains a hydrophilic colloid to form a dough, gelatinizing, cooling, dividing into flakes or pieces and drying them to such an extent that the moisture content remaining therein is from 8 to 12% and immersing the partially dried flakes or pieces in a hot edible oil whereby a frothed, cellular or sponge-like product is obtained.

THOMAS LEWIS SHEPHERD.